(12) United States Patent
Craven-Bartle et al.

(10) Patent No.: US 10,401,546 B2
(45) Date of Patent: Sep. 3, 2019

(54) OPTICAL COMPONENT FOR LIGHT COUPLING

(71) Applicant: FlatFrog Laboratories AB, Lund (SE)

(72) Inventors: Thomas Craven-Bartle, Södra Sandby (SE); Håkan Bergström, Torna-hällestad (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 15/551,714

(22) PCT Filed: Feb. 29, 2016

(86) PCT No.: PCT/SE2016/050155
§ 371 (c)(1),
(2) Date: Aug. 17, 2017

(87) PCT Pub. No.: WO2016/140612
PCT Pub. Date: Sep. 9, 2016

(65) Prior Publication Data
US 2018/0031753 A1 Feb. 1, 2018

(30) Foreign Application Priority Data
Mar. 2, 2015 (SE) ....................... 1550244

(51) Int. Cl.
*G02B 5/04* (2006.01)
*F21V 8/00* (2006.01)
(Continued)

(52) U.S. Cl.
CPC ........... *G02B 6/0025* (2013.01); *G02B 5/045* (2013.01); *G02B 6/00* (2013.01); *G02B 6/0053* (2013.01);
(Continued)

(58) Field of Classification Search
CPC ........ G02B 5/04; G02B 5/045; G02B 6/0025; G02B 6/0053; G06F 3/042
(Continued)

(56) References Cited

U.S. PATENT DOCUMENTS

| 3,440,426 A | 4/1969 | Bush |
| 3,553,680 A | 1/1971 | Cooreman |

(Continued)

FOREIGN PATENT DOCUMENTS

| CN | 201233592 Y | 5/2009 |
| CN | 101644854 A | 2/2010 |

(Continued)

OTHER PUBLICATIONS

Ahn, Y., et al., "A slim and wide multi-touch tabletop interface and its applications," BigComp2014, IEEE, 2014, in 6 pages.

(Continued)

*Primary Examiner* — Ricky D Shafer
(74) *Attorney, Agent, or Firm* — Knobbe Martens Olson & Bear, LLP

(57) ABSTRACT

The invention provides an optical component for transferring light between an opto-electronic device and a light transmissive panel which defines two opposing boundary surfaces, the optical component having a shape formed from a geometric shape having a base surface, a lateral front surface and an axis, wherein the geometric shape is truncated by a plane intersecting the front surface, the base surface, and the axis, forming a back surface. The base surface is configured for mounting the optical component to the light transmissive panel and for coupling light into the light transmissive panel. The front surface being configured for coupling light from the front surface, through the base (Continued)

surface, and into the light transmissive panel for the light to propagate by total internal reflection within the light transmissive panel.

13 Claims, 4 Drawing Sheets

(51) Int. Cl.
*G02B 6/00* (2006.01)
*G06F 3/042* (2006.01)

(52) U.S. Cl.
CPC ............ *G06F 3/042* (2013.01); *G06F 3/0428* (2013.01); *G06F 2203/04109* (2013.01)

(58) Field of Classification Search
USPC ............... 359/625, 626, 627, 833, 837, 834; 385/36
See application file for complete search history.

(56) References Cited

U.S. PATENT DOCUMENTS

| | | | |
|---|---|---|---|
| 3,673,327 A | 6/1972 | Johnson et al. | |
| 4,129,384 A | 12/1978 | Walker et al. | |
| 4,180,702 A | 12/1979 | Sick et al. | |
| 4,209,255 A | 6/1980 | Heynau et al. | |
| 4,213,707 A | 7/1980 | Evans, Jr. | |
| 4,254,333 A | 3/1981 | Bergström | |
| 4,254,407 A | 3/1981 | Tipon | |
| 4,294,543 A | 10/1981 | Apple et al. | |
| 4,346,376 A | 8/1982 | Mallos | |
| 4,420,261 A | 12/1983 | Barlow et al. | |
| 4,484,179 A | 11/1984 | Kasday | |
| 4,507,557 A | 3/1985 | Tsikos | |
| 4,521,112 A | 6/1985 | Kuwabara et al. | |
| 4,542,375 A | 9/1985 | Alles et al. | |
| 4,550,250 A | 10/1985 | Mueller et al. | |
| 4,593,191 A | 6/1986 | Alles | |
| 4,673,918 A | 6/1987 | Adler et al. | |
| 4,688,933 A | 8/1987 | Lapeyre | |
| 4,688,993 A | 8/1987 | Ferris et al. | |
| 4,692,809 A | 9/1987 | Beining et al. | |
| 4,710,760 A | 12/1987 | Kasday | |
| 4,736,191 A | 4/1988 | Matzke et al. | |
| 4,737,626 A | 4/1988 | Hasegawa | |
| 4,746,770 A | 5/1988 | McAvinney | |
| 4,752,655 A | 6/1988 | Tajiri et al. | |
| 4,772,763 A | 9/1988 | Garwin et al. | |
| 4,782,328 A | 11/1988 | Denlinger | |
| 4,812,833 A | 3/1989 | Shimauchi | |
| 4,837,430 A | 6/1989 | Hasegawa | |
| 4,868,912 A | 9/1989 | Doering | |
| 4,891,829 A | 1/1990 | Deckman et al. | |
| 4,916,712 A * | 4/1990 | Bender | H01S 3/0606 372/100 |
| 4,933,544 A | 6/1990 | Tamaru | |
| 4,949,079 A | 8/1990 | Loebner | |
| 4,986,662 A | 1/1991 | Bures | |
| 4,988,983 A | 1/1991 | Wehrer | |
| 5,065,185 A | 11/1991 | Powers et al. | |
| 5,073,770 A | 12/1991 | Lowbner | |
| 5,105,186 A | 4/1992 | May | |
| 5,159,322 A | 10/1992 | Loebner | |
| 5,166,668 A | 11/1992 | Aoyagi | |
| 5,227,622 A | 7/1993 | Suzuki | |
| 5,248,856 A | 9/1993 | Mallicoat | |
| 5,254,407 A | 10/1993 | Sergerie et al. | |
| 5,345,490 A | 9/1994 | Finnigan et al. | |
| 5,383,022 A | 1/1995 | Kaser | |
| 5,483,261 A | 1/1996 | Yasutake | |
| 5,484,966 A | 1/1996 | Segen | |
| 5,499,098 A | 3/1996 | Ogawa | |
| 5,502,568 A | 3/1996 | Ogawa et al. | |
| 5,525,764 A | 6/1996 | Junkins et al. | |
| 5,526,422 A | 6/1996 | Keen | |
| 5,570,181 A | 10/1996 | Yasuo et al. | |
| 5,572,251 A | 11/1996 | Ogawa | |
| 5,577,501 A | 11/1996 | Flohr et al. | |
| 5,600,105 A | 2/1997 | Fukuzaki et al. | |
| 5,608,550 A * | 3/1997 | Epstein | F21V 5/02 349/57 |
| 5,672,852 A | 9/1997 | Fukuzaki et al. | |
| 5,679,930 A | 10/1997 | Katsurahira | |
| 5,686,942 A | 11/1997 | Ball | |
| 5,688,933 A | 11/1997 | Evans et al. | |
| 5,729,249 A | 3/1998 | Yasutake | |
| 5,736,686 A | 4/1998 | Perret, Jr. et al. | |
| 5,740,224 A | 4/1998 | Müller et al. | |
| 5,764,223 A | 6/1998 | Chang et al. | |
| 5,767,517 A | 6/1998 | Hawkins | |
| 5,775,792 A | 7/1998 | Wiese | |
| 5,945,980 A | 8/1999 | Moissev et al. | |
| 5,945,981 A | 8/1999 | Paull et al. | |
| 5,959,617 A | 9/1999 | Bird et al. | |
| 6,061,177 A | 5/2000 | Fujimoto | |
| 6,067,079 A | 5/2000 | Shieh | |
| 6,122,394 A | 9/2000 | Neukermans et al. | |
| 6,141,104 A | 10/2000 | Schulz et al. | |
| 6,172,667 B1 | 1/2001 | Sayag | |
| 6,227,667 B1 | 5/2001 | Halldorsson et al. | |
| 6,229,529 B1 | 5/2001 | Yano et al. | |
| 6,333,735 B1 | 12/2001 | Anvekar | |
| 6,366,276 B1 | 4/2002 | Kunimatsu et al. | |
| 6,380,732 B1 | 4/2002 | Gilboa | |
| 6,380,740 B1 | 4/2002 | Laub | |
| 6,390,370 B1 | 5/2002 | Plesko | |
| 6,429,857 B1 | 8/2002 | Masters et al. | |
| 6,452,996 B1 | 9/2002 | Hsieh | |
| 6,476,797 B1 | 11/2002 | Kurihara et al. | |
| 6,492,633 B2 | 12/2002 | Nakazawa et al. | |
| 6,495,832 B1 | 12/2002 | Kirby | |
| 6,504,143 B2 | 1/2003 | Koops et al. | |
| 6,529,327 B1 | 3/2003 | Graindorge | |
| 6,538,644 B1 | 3/2003 | Muraoka | |
| 6,587,099 B2 | 7/2003 | Takekawa | |
| 6,648,485 B1 | 11/2003 | Colgan et al. | |
| 6,660,964 B1 | 12/2003 | Benderly | |
| 6,664,498 B2 | 12/2003 | Forsman et al. | |
| 6,664,952 B2 | 12/2003 | Iwamoto et al. | |
| 6,690,363 B2 | 2/2004 | Newton | |
| 6,707,027 B2 | 3/2004 | Liess et al. | |
| 6,738,051 B2 | 5/2004 | Boyd et al. | |
| 6,748,098 B1 | 6/2004 | Rosenfeld | |
| 6,784,948 B2 | 8/2004 | Kawashima et al. | |
| 6,799,141 B1 | 9/2004 | Stoustrup et al. | |
| 6,806,871 B1 | 10/2004 | Yasue | |
| 6,927,384 B2 | 8/2005 | Reime et al. | |
| 6,940,286 B2 | 9/2005 | Wang et al. | |
| 6,965,836 B2 | 11/2005 | Richardson | |
| 6,972,753 B1 | 12/2005 | Kimura et al. | |
| 6,985,137 B2 | 1/2006 | Kaikuranta | |
| 7,042,444 B2 | 5/2006 | Cok | |
| 7,084,859 B1 | 8/2006 | Pryor | |
| 7,133,031 B2 | 11/2006 | Wang et al. | |
| 7,176,904 B2 | 2/2007 | Satoh | |
| 7,199,932 B2 * | 4/2007 | Sugiura | G02B 6/0038 359/625 |
| 7,359,041 B2 | 4/2008 | Xie et al. | |
| 7,397,418 B1 | 7/2008 | Doerry et al. | |
| 7,432,893 B2 | 10/2008 | Ma et al. | |
| 7,435,940 B2 | 10/2008 | Eliasson et al. | |
| 7,442,914 B2 | 10/2008 | Eliasson et al. | |
| 7,465,914 B2 | 12/2008 | Eliasson et al. | |
| 7,613,375 B2 | 11/2009 | Shimizu | |
| 7,629,968 B2 | 12/2009 | Miller et al. | |
| 7,646,833 B1 | 1/2010 | He et al. | |
| 7,653,883 B2 | 1/2010 | Hotelling et al. | |
| 7,655,901 B2 | 2/2010 | Idzik et al. | |
| 7,705,835 B2 | 4/2010 | Eikman | |
| 7,729,056 B2 * | 6/2010 | Hwang | G02B 3/0031 359/454 |
| 7,847,789 B2 | 12/2010 | Kolmykov-Zotov et al. | |
| 7,855,716 B2 | 12/2010 | McCreary et al. | |

(56) References Cited

U.S. PATENT DOCUMENTS

| | | |
|---|---|---|
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 * | 4/2017 | Yoon ................. G02B 6/0053 |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |

(56) References Cited

U.S. PATENT DOCUMENTS

| | | |
|---|---|---|
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |

(56) References Cited

U.S. PATENT DOCUMENTS

| | | |
|---|---|---|
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1 | 6/2013 | Holmgren et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0367873 A1 | 12/2014 | Yang et al. STET |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0009687 A1* | 1/2015 | Lin .................. G02B 6/0031 362/343 |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergstrom et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |

(56) References Cited

FOREIGN PATENT DOCUMENTS

| | | |
|---|---|---|
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 00/50807 A1 | 8/2000 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012105893 A1 | 8/2012 |
| WO | WO 201 2/1 21 65 | 9/2012 |
| WO | WO 201 2/1 581 0 | 11/2012 |
| WO | WO 2012/172302 A1 | 12/2012 |
| WO | WO 2012/176801 A1 | 12/2012 |
| WO | WO 2013036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014055809 A1 | 4/2014 |
| WO | WO 2014/098744 A1 | 6/2014 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
Johnson, M., "Enhanced Optical Touch Input Panel", IBM Technical Discolusre Bulletin, 1985, in 3 pages.
Kak, et al., "Principles of Computerized Tomographic Imaging", Institute of Electrical Engineers, Inc., 1999, in 333 pages.
The Laser Wall, MIT, 1997, http://web.media.mit.edu/~joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
International Search Report and Written Opinion for International App. No. PCT/SE2016/050155, dated Jul. 15, 2016, in 10 pages.
Supplementary European Search Report for European App. No. EP 16759213, dated Oct. 4, 2018, in 9 pages.

* cited by examiner

OPTICAL COMPONENT FOR LIGHT COUPLING

CROSS-REFERENCE TO RELATED APPLICATIONS

This application claims the benefit and priority to and is a U.S. National Phase of PCT International Application No. PCT/SE2016/050155, filed on Feb. 29, 2016. This application claims the benefit and priority to Swedish Patent Application No. 1550244-6, filed Mar. 2, 2015. The disclosure of the above-referenced applications are hereby expressly incorporated by reference in their entirety.

FIELD OF THE INVENTION

The present invention relates to an optical component for transferring light between an opto-electronic device and a light transmissive panel which defines two opposing boundary surfaces for a touch-sensing system. Multiple such optical components may be arranged as an array to couple light into the light transmissive panel.

BACKGROUND OF THE INVENTION

Touch-sensing systems ("touch systems") are in widespread use in a variety of applications. Typically, the touch systems are actuated by a touching object such as a finger or stylus, either in direct contact, or through proximity (i.e. without contact), with a touch surface. Touch systems are for example used as touch pads of laptop computers, in control panels, and as overlays to displays on, e.g., hand held devices, such as mobile telephones, but also on larger devices and displays. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc. into a touch panel. There are also various types of optical touch systems, which e.g. detect shadows cast by touching objects onto a touch surface, or detect light scattered off the point(s) of touching objects on a touch panel.

One specific type of optical touch system uses projection measurements of light that propagates on a plurality of propagation paths inside a light transmissive panel that defines a touch surface. The projection measurements thus quantify a property, e.g. power, of the light on the individual propagation paths, when the light has passed the panel. The light propagates inside the panel by total internal reflection (TIR) against the touch surface, such that objects on the touch surface causes the propagating light on one or more propagation paths to be attenuated, commonly denoted FTIR (Frustrated Total Internal Reflection). For touch determination, the projection measurements may be processed by simple triangulation, or by more advanced image reconstruction techniques that generate a two-dimensional distribution of disturbances on the touch surface, i.e. an "image" of everything on the touch surface that affects the measured property. Examples of such touch systems are found in U.S. Pat. No. 3,673,327, 4,254,333, 6,972,753, 7,432,893, US2006/0114237, US2007/0075648, WO2009/048365, US2009/0153519, WO2010/006882, WO2010/064983, WO2010/134865 and WO2012/105893.

WO2013/036192 discloses a light coupling structure for optical touch panels, such as of the type in the above referenced documents. The coupling structure is used to in-couple light from a light source, such as an LED, to the panel at an angle suitable for TIR (total internal reflection) in a touch panel. The light coupling structure is relatively large and takes up significant space underneath the panel. However, the available space for the touch-sensing system is scarce, particularly at the periphery of the touch panel where opto-electronic components are mounted in an electrical device. This is even more problematic for smaller devices having a touch-sensing system. The light coupling structure is also relatively costly to manufacture and mount on the panel. Finally, a reliability problem may occur as the temperature coefficient differences between components and the panel can result in reduced performance over time. Another problem is that, for optical components with a broad illumination directed onto to the glass, a large fraction of the light will not be coupled into the panel.

Attempts have been made to use a film with dome shaped lenses arranged in an array on a transparent substrate for coupling light from the light source to a panel of a touch-sensing system. Such substrates with dome shaped lenses are e.g. disclosed in WO2006/034409A2 but used for a different purpose than coupling light into a light transmissive panel of a touch-sensing system. In the field, the 'region of interest' is defined as the angular range, both in the theta ($\theta$—i.e. the angle of the light from the normal of the plane of the panel) range and phi ($\varphi$—i.e. the angle of the light from the normal of the edge of the panel and in the plane of the panel) range of light travelling in the glass from which the system is configured to derive a touch signal. This range may be chosen for optimal touch resolution and to exclude contamination noise. In a touch-sensing system using TIR for the propagation of the light in the touch panel, the region of interest of light inside the panel is between 40°-90° for $\theta$, although preferably between 50°-75°, and a range of ±75° for $\varphi$. This means that for a dome shaped structure, only a small fraction of the dome shaped surface refracts the light at an angle to propagate within the panel via TIR within the region of interest and to provide effective and contamination resistant touch detection. Therefore, a dome shaped solution is not efficient for in-coupling of light to a touch panel. Hence, a shape of the primitive that directs light needs to be found to couple larger numbers of photons into the light transmissive panel at angles matching the ROI for touch-sensing systems based on light propagating by TIR.

The present invention addresses a widely recognized need for efficient coupling of light into a light transmissive panel for a touch-sensing system, and thus provides for improved power efficiency and/or a more compact design.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing an optical component, an arrangement with a plurality of such optical components, and a method for producing the optical components.

The invention is defined by the appended claims.

A first object is to provide an optical component for transferring light between an opto-electronic device and a light transmissive panel which defines two opposing boundary surfaces, the optical component having a shape corresponding to a geometric shape having a base surface, a lateral front surface and an axis, wherein the geometric shape is truncated by a plane intersecting the front surface, the base surface, and the axis, forming a back surface. The base surface is configured for mounting the optical component to the light transmissive panel and for coupling light into the light transmissive panel. The front surface being configured for coupling light from the front surface, through the base surface, and into the light transmissive panel for the light to propagate by total internal reflection within the light transmissive panel.

A second object is to provide an arrangement, using the optical components of the first embodiment, for transferring light between an opto-electronic device and a light transmissive panel which defines two opposing boundary surfaces. The arrangement comprises a plurality of partially overlapping optical components according to any of the previous claims forming a continuous element arranged in at least one row with a predetermined peak to peak spacing between the peaks of neighboring optical components of a row, wherein a peak is the point on the optical component furthest from the base surface of the optical component.

Some embodiments of the invention provide for efficient in-coupling of light into a light transmissive panel.

Some embodiments of the invention also provide an optical component for transferring light between an opto-electronic device and a light transmissive panel with a compact design which is also efficient to couple large number of photons to the light transmissive panel.

Some embodiments of the invention also provide for an optical component for transferring light, which is shift invariant, between the opto-electronic device and the light transmissive panel.

Some embodiments of the invention provide for mounting optical components in close proximity to the glass panel and a space efficient arrangement may be obtained.

The term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DESCRIPTION OF EMBODIMENTS

Figure 1:
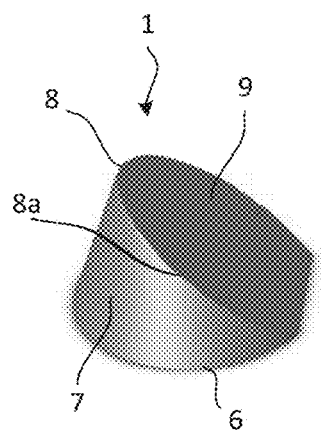
FIG. 1 is a perspective view of an example of the optical component.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present description of the current invention is given with reference to a touch-sensing system using Total Internal Reflection (TIR) and Frustrated Total Internal Reflection (FTIR) for the propagation of light and detection of light as an example only.

FIG. 1 illustrates an optical component 1 for transferring light between an opto-electronic device 2a, 2b (FIG. 5a) and a light transmissive panel 3 (FIG. 5a) which defines two opposing boundary surfaces. The optical component 1 comprises a base surface 6 for coupling light into the panel 3 by index matching. The base 6 may also be used for mounting the optical component 1 to the panel 3. A front surface 7 is arranged relative the base 6 for directing and redirecting light from the front surface 7 towards the base 6 to propagate by TIR within the panel 3 in a region of interest. The front surface 7 extends from the base to a ridge 8a opposite the base 6. Peak 8 is the highest point of the optical component 1 along ridge 8a as measured from the base 6 perpendicularly towards the intersection of the front surface 7 and the back surface 9. A back surface 9 extends from the base to the ridge 8a. A light source, such as an emitter 2a (FIG. 5a) may be arranged to direct light at an angle substantially normal to a portion of front surface 7. Hence, light directed towards the optical component 1 will be coupled into the optical component 1, and refracted at suitable angles to propagate by TIR when coupled to the panel 3 via the base surface 6.

Figure 2:
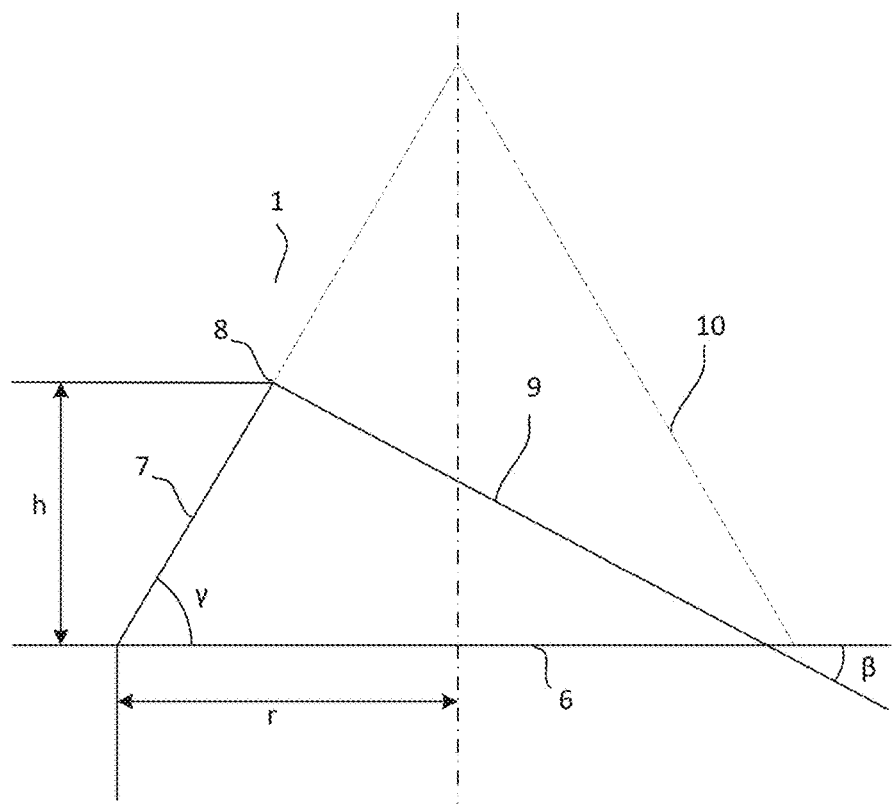
FIG. 2 is a cross-sectional view illustrating geometrical principles of an example of the optical component.

As can be seen in FIG. 2, the optical component 1 has a wedge shape in a vertical cross section through the base 6, the front surface 7, and the back surface 9. The vertical cross section is taken along an axis from the peak 8 perpendicular towards the base 6. Hence, wedge as used herein means that the optical component 1 in cross-section has one pointed end and one thicker end. The pointed end is formed at the intersection of the back surface 9 and the base 6, and the thicker end is formed by the front surface 7, especially at the peak 8. The front surface 7 is also referred to herein as a coupling surface, since it is used for coupling light into the optical component 1. The back surface 9 is referred to herein as a sloped surface, since it is sloped from the thicker end towards the thinner end of the optical component 1. Optical component 1 of FIG. 2 may also be described as a truncated cone having radius r, a base surface 6, a lateral front surface 7 and an axis, according to well-known definitions used for geometric cone shapes. The cone is truncated by a plane intersecting the front surface, the base surface, and the axis, forming back surface 9.

In some embodiments, the front surface 7 extends from the base 6 towards the peak 8 and is inclined with a constant angle relative the base 6. Although the edge between front surface 7 and base surface 6 may describe an arc or circle, the angle between the front surface 7 and base surface 6 is constant at every point along said arc or circle. The back surface 9 may form a sloped surface that extends from the base 6 towards the peak 8 with an angle relative the base 6 that is smaller than the at least one angle of the front surface 7 relative the base 6. Hence, the wedge shaped geometry is formed, which allows for coupling light from the emitter into the panel within the region of interest while excluding light outside the region of interest.

The front surface 7 may be inclined with at least one fixed angle relative the base 6. Hence, since the front surface 7 is inclined with a fixed angle, the entire front surface 7, in the axial direction of the optical component 1, may be used to couple photons into the panel 3 within the region of interest. Hence, efficient coupling of photons is provided for. This is different from a dome shaped surface, which has a continuously changing angle between the coupling surface and the base 6, wherein light useful for TIR is only coupled for a fraction of the coupling surface. Hence, the primitive according to the invention provides increased efficiency of in-coupling of light.

Figure 5A:
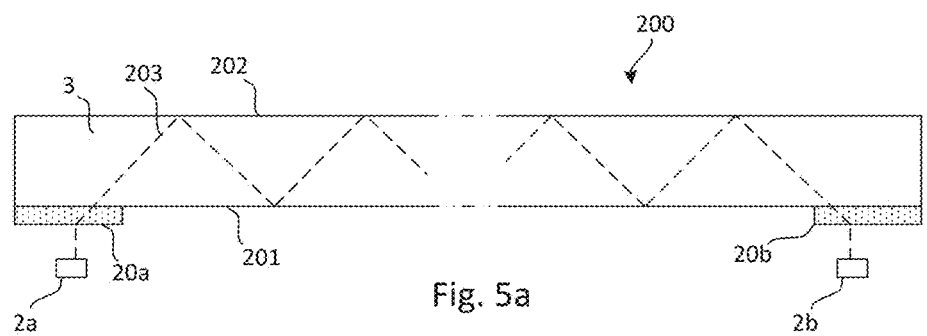
FIG. 5a is a cross-sectional view and 5b is a block-diagram, illustrating an example touch-sensing system comprising the optical component.

In the embodiment of FIG. 1, the front surface 7 forms a section of a conical surface. Using a section of a conical surface provides for divergence of the light in a direction parallel to the boundary surfaces 201, 202 (FIG. 5*a*). The size and shape of the conical surface impacts the divergence. Embodiments of the size and shape are further defined below. For more details regarding the divergence, reference is made to WO2013/036192, which is incorporated herein by reference for all purposes, particularly with regard to the propagation of light by TIR, divergence, as well as ranges of incident angles relevant for appropriate coupling of light into the panel 3.

In some embodiments, the front surface 7 forms a prismatic surface, such as a plurality of triangular surfaces or a plurality of conical sections having their base at the base 6 of the optical component 1 and their vertex at the peak 8. Hence, the front surface does not have to be completely smooth. The prismatic surface is inclined with at least one fixed angle relative the base 6 for each section of the prismatic surface. Hence, the prismatic surface may have a plurality of surfaces which are inclined with at least one fixed angle relative the base 6 at a single cross section of the optical component 1 taken along the axis extending perpendicular from the base 6 towards the peak 8.

Back surface 9 provides for reflecting or refracting light directed towards the optical component 1 that is outside the range suitable for propagating the light by TIR in the panel 3 within the region of interest. The angle β between the base 6 and back surface 9 may be selected such that the back surface 9 is hit by a minimal number of rays from an emitter passing into the panel within the region of interest. Similarly, β may be selected such that the back surface 9 is hit by a minimum number of rays light passing out of the panel to a detector. In a preferred embodiment, of the light being transmitted by an emitter and successfully received by a detector, the amount of light passing through back surface 9 is less than 5%, whereas the amount of light passing through front surface 7 is at least 95%. Of the aforementioned light passing through front surface 7, less than 5% will reflect on back surface 9 before coupling into the panel within the region of interest. An optimal range for β of between 20° and 60° has been determined to be most effective at coupling light into the panel within the region of interest, with a preferred embodiment having a value of β of 40°.

In another embodiment, optical component 1 may comprise a truncated cylinder shape having radius r, a base surface, a front surface and an axis. The cylinder is truncated by a plane intersecting the front surface, the base surface, and the axis, forming a back surface in the same plane as surface 9.

The unifying principle of the above geometric shapes is that of providing a front surface for receiving light and a substantially flat surface 9 for reflecting light travelling within the optical component into the panel.

The back surface 9 may be coated with a reflective coating, such as mirror coated, using e.g. aluminum sputtering. Hence, the reflective properties of the back surface 9 may be enhanced, providing an effective angular filter for filtering ambient light. In an embodiment of the invention, vacuum deposition of Al, Ag, Au, or Cu are used as material for the mirror coating.

The intersection of the front surface 7 and the back surface 9, i.e. from one side of the base 6, towards the peak 8 and back to the base 6 on the opposite side of the base 6, forms a curved ridge 8*a*, such as an arc shaped ridge, which is inclined relative the base 6. In some embodiments the curved edge extends less than 360° around the base 6, as is illustrated in FIG. 1. The extent of the curved ridge 8*a*, and thus the extension of the front surface 7 in a lateral direction of the optical component 1, can be used to configure the distribution in phi of the light coupled into panel 3. In some embodiments, the intersection may form a conic section.

As can be seen in FIG. 2, the optical component 1 is in some embodiments designed based on a cone 10, which is illustrated in phantom lines. A top section of the cone is cut away at a plane that is inclined to the axis of the triangle and cuts the generators of the cone. Hence, an elliptical or semi-elliptical surface, depending on the position of the plane relative the vertex of the cone 10, is created, which forms the back surface 9. The remaining surface of the conical surface of the cone 10 is a section of a conical surface that forms the front surface 7. In a preferred embodiment, the cone is a right circular cone, having an apex aligned directly above the center of the base surface 6 and wherein base surface 6 has a circular shape.

FIG. 2 illustrates some geometrical aspects of embodiments of the optical component 1 in a cross section taken along the vertical axis of the optical component 1 at the peak 8, i.e. at the highest aspect of the optical component 1. The maximum base radius r of base 6 is limited by the manufacturing methods and mechanical size constraints only. It is understood that radius r may otherwise be scaled without limitation to its optical function. In a preferred embodiment of the invention, a typical radius r for roll to roll UV resin replication is 30 microns. It should be noted that the base radius is measured from the center of the cone 10 from which the optical component 1 is designed.

Figure 3A:
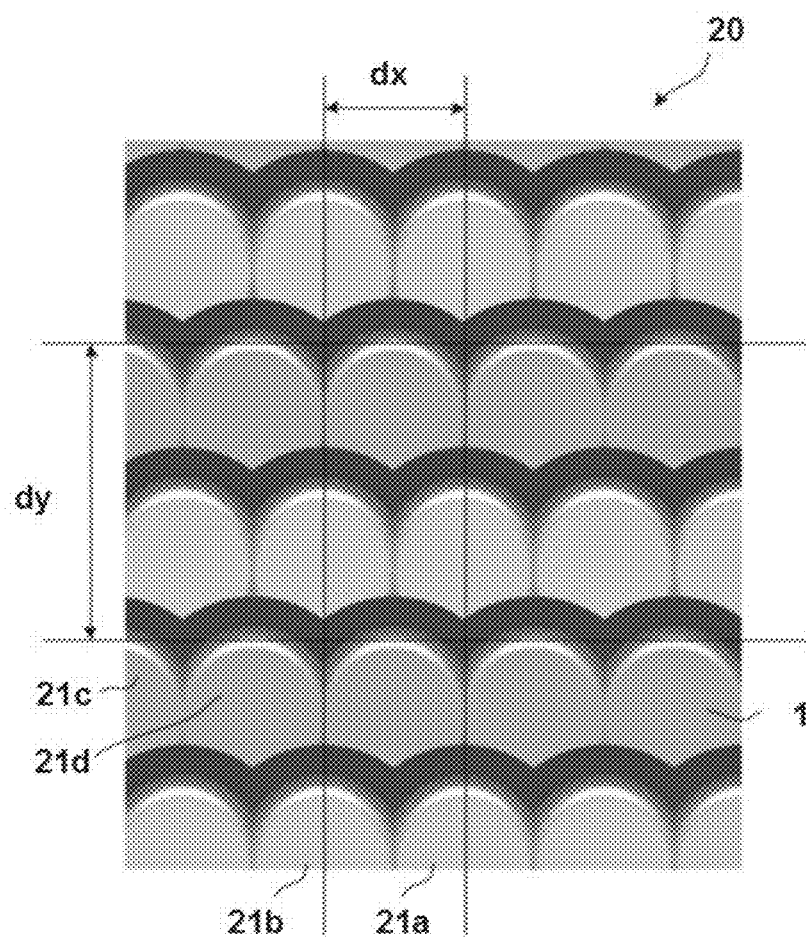
FIG. 3a is a top view illustrating geometrical principles of an example of the array of optical components.

FIG. 3*a* illustrates an arrangement 20 for transferring light between the opto-electronic device and the panel 3. The arrangement comprises a plurality of optical components 21*a*, 21*b*, 21*c*, 21*d* according to embodiments of the invention, which may form an array of optical components. The optical components 1, 21*a*, 21*b*, 21*c*, 21*d* are primitives in the micro-meter to mm range. Hence, the arrangement forms a very compact design for coupling light into the panel 3 in which the arrangement comprises partially overlapping components forming a continuous element. In the embodiment of FIG. 3*a*, the peak to peak distance dy of a recurring pattern of rows of optical components is indicated. The spacing between peaks of optical components of separate rows is referred to as inter-peak spacing and may be dy/2. The inter-peak distance is measured perpendicularly from one row of optical components to another row of optical components. The peaks of one row may be displaced along one axis, such as the x-axis, relative optical components of a neighboring row, such as illustrated in FIG. 3*a*. Preferably, the rows are displaced with respect to one another in a manner which minimizes the shadowing of one row to the next i.e. that the amount of light arriving at a first row from the light source is not significantly reduced by the shadow cast by a second row, closer to the light source than the first row. In some embodiments, the inter-peak spacing may be in the region of 75 µm. In a preferred embodiment, the peaks of one row are displaced along the x-axis (i.e. the axis along which the row runs) relative to optical components of a neighboring row by half of the peak to peak distance dx between the peaks of neighboring optical components of the row.

Furthermore, FIG. 3a illustrates that the optical components 21a, 21b, 21c, 21d may be arranged in at least one row with a predetermined peak to peak distance dx between the peaks of neighboring optical components of a single row, which is referred to as intra-peak spacing. In the preferred embodiment, the intra-peak spacing may be in the region of 70 µm. The optical components 21a, 21b are arranged in a plurality of rows, which forms an array of optical components, with a predetermined peak to peak distance between the peaks of optical components of separate rows, such as optical components 21a, 21b in a first row and optical components 21c, 21d, of a second row. It should be noted that the intra-peak distance effects φ, limiting it to the critical angle of the light incident to the material of the optical component as the intra-peak distance tends to zero.

Hence, the intra-peak spacing may be the same for all optical components for at least one row of optical components. In some embodiments, the intra-peak spacing is the same for all optical components of the arrangement. In other embodiments, the intra-peak spacing varies between the optical components of that row. In other embodiments, the intra-peak spacing within a single row is fixed, whereas it varies between separate rows. The intra-peak spacing impacts the lateral width of the front surface 7 from one side of the base 6 to an opposite side of the base 6, whereby the desired φ of the light coupled into to the panel may be obtained by optimizing the intra-peak spacing.

Hence, when the arrangement comprises a plurality of rows of optical components, the inter-peak spacing, measured perpendicularly from a line connecting the peaks of a first row to a line connecting the peaks of a neighboring second row, may be larger than the intra-peak spacing.

Optimizing the intra-peak spacing dx as well as the inter-peak spacing dy/2 provides for optimized arrays or patterns of optical components 21a, 21b adopted to the illumination angle of the light source. The arrangement 20 may thus be adapted to a specific light source with a specific location. Hence, embodiments of the arrangement 20 provides for a flexible design of optical components 21a, 21b for coupling light to a panel 3 for a touch-system.

In one embodiment of the invention, for example, shift variant designs are employed. Shift variant designs (i.e. designs which are not uniformly repeating and comprise customized arrangements of optical components) are much more tolerance sensitive, more expensive and difficult to produce, and less general to implement. However, they can be significantly more efficient at coupling light into and out of a panel if the required tolerances can be achieved. Shift invariant designs (i.e. designs which are uniformly repeating such that the optical properties of the components are substantially the same across the arrangement) require much lower tolerances but are less efficient at coupling light into and out of a panel.

In one embodiment of the invention, the alignment of the intra-peak spacing dx and inter-peak spacing dy between components and rows respectively is randomly determined.

Figure 3B:
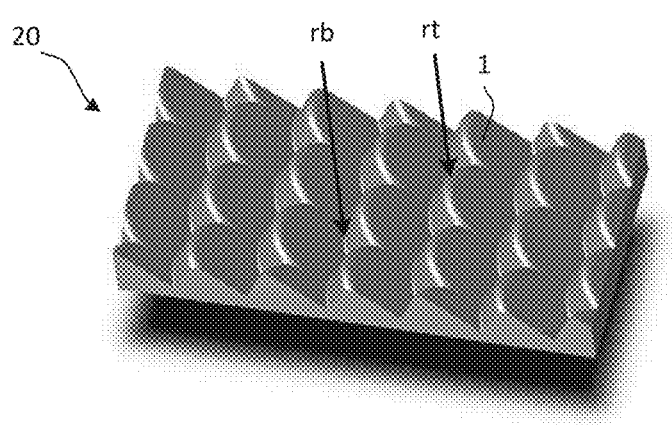
FIG. 3b is a perspective view illustrating geometrical principles of an example of the array of optical components.
Figure 6:
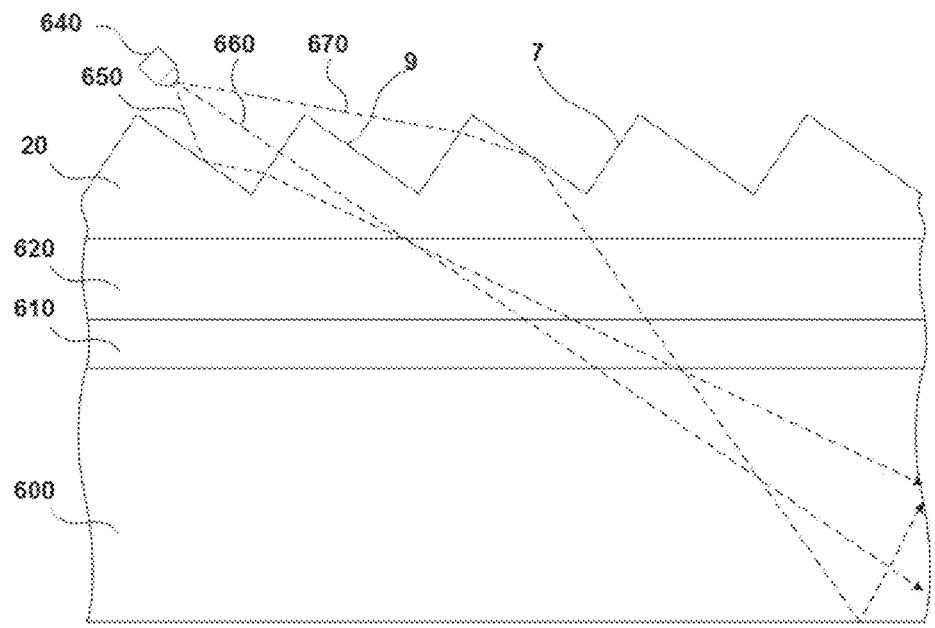
FIG. 6 is a cross-sectional view illustrating possible paths taken by light from a light source to propagate within the panel.

As is illustrated in FIG. 3b, the optical component or the arrangement of optical components 20 may be arranged on an angular filter 610 (shown in FIG. 6). The angular filter may be configured to reflect light that is below 50° relative a normal to the base 6 and the angular filter. Hence, the angular filter may filter ambient light incident through the panel 3 towards the base 6.

As is also illustrated in FIG. 3b, an edge rt formed at the intersection of the front surface 7 and the back surface 9 may be rounded. This rounded edge may have a radius of about 6-14 µm, such as 8-12 µm. In some embodiments a valley rb is formed at the intersection where the front surface 7 meets the back surface 9 of surrounding optical components. The valley may be curved, such as with a radius of about 1-6 µm, such as 2-4 µm.

FIG. 6 illustrates the arrangement of optical components 20 in cross section. In the embodiment shown, optical components 20 are mounted on a PET substrate 620, with an angular filter layer 610 between PET substrate 620 and glass 600. Optical paths 650, 660, and 670 from emitter 640 are shown. First, optical path 650 shows the light from emitter 640 emitted at an angle causing the light to reflect off back surface 9 towards front surface 7, wherein the light is refracted into the panel within the region of interest. Second, optical path 660 shows the light from emitter 640 emitted at an angle substantially normal to a portion of front surface 7 causing the light pass through front surface 7, wherein the light is refracted into the panel within the region of interest. Third, optical path 670 shows the light from emitter 640 emitted at an angle causing the light to pass through front surface 7, wherein the light is refracted onto back surface 9, wherein the light is reflected into the panel within the region of interest. Other more complex paths coupling the light into the panel into the region of interest are known but not described here. However, the vast majority of light not following one of these three paths will not be received by a detector.

Figure 7:
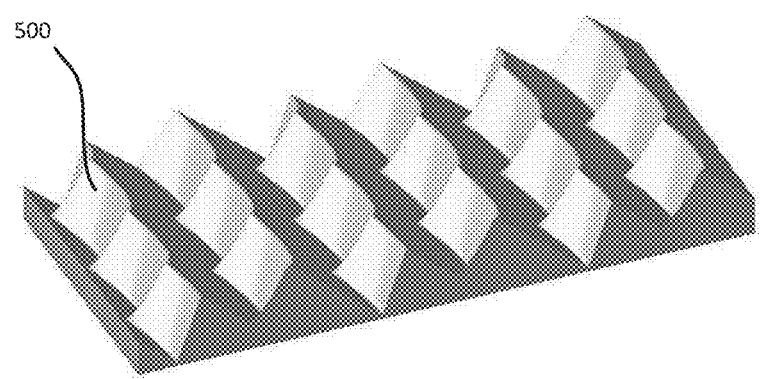
FIG. 7 illustrates an embodiment of the invention in which the optical components of FIG. 3b are inverted.

FIG. 7 illustrates an embodiment of the invention in which the above concepts are retained but the shape of optical components 20 is inverted. As can be envisaged, the shape shown in FIG. 7 can be used as the manufacturing tool for stamping or embossing the shape of FIG. 3b. Likewise, the shape of FIG. 3b can be used as the manufacturing tool for stamping or embossing the shape of FIG. 7. The optical properties of shape of FIG. 7 provides for very similar functionality to that of FIG. 3b and may be selected as a suitable alternative for coupling light from a light source into the panel within the region of interest.

Figure 4:
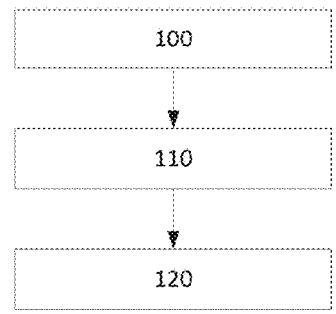
FIG. 4 is a flow-chart of an example method for producing an array of optical components.

FIG. 4 illustrates a method for configuring a tool used for producing an array of optical components according to embodiments of the invention.

In a step 100, the array of optical components is produced. The follow embodiments describe techniques for doing so.

In one embodiment, a tool is configured with a first column of optical components arranged with an inter-peak spacing between the peaks of neighboring optical components of the nearby rows, such as in within the ranges defined above. A second column of optical components is arranged with an intra-peak distance between the peaks of the same rows. The inter-peak spacing may be set within the range as defined above. The intra-peak and/or the intra-peak spacing may be predefined. Furthermore, the optical components may be arranged in more than two rows of optical components with varying inter-peak spacing between neighboring rows. Similarly, the intra-peak spacing may vary between optical components of a single row. Hence, the optical components of at least one row may be arranged with varying intra-peak spacing. The tool is then used for production of an array of optical components, preferably by stamping or embossing.

The array of optical components may be produced by casting in a substrate. The substrate is substantially transparent, and may be made of a polymer, such as polyethylene terephthalate (PET), polycarbonate, PMMA, or other suitable materials.

In the preferred embodiment of the invention, optical components 20 are arranged on one side of the substrate. A slight overlap of one row over a previous row is provided, wherein the front surface 7 is arranged on top of at least one back surface 9 of an optical component of a previous row. Similarly, optical components within the same row are provided with a slight overlap, as seen in FIGS. 3a and 3b. The optical components may be produced using the same type of material as for the substrate. The substrate may thus form the base 6 of the optical component 1. In another embodiment, the optical components are embossed onto extruded plastic strips attached to the panel. In yet another embodiment, the optical components are formed using UV embossing of resin on the panel.

In a step 110, an angular filter 610 (shown in FIG. 6) is provided with an adhesive layer 620.

In a step 120, the substrate is fixed to the angular filter 610 (shown in FIG. 6) by means of the adhesive layer 620.

In an alternative embodiment, optical components 20 are formed by embossing angular filter 610 directly.

Figure 5B:
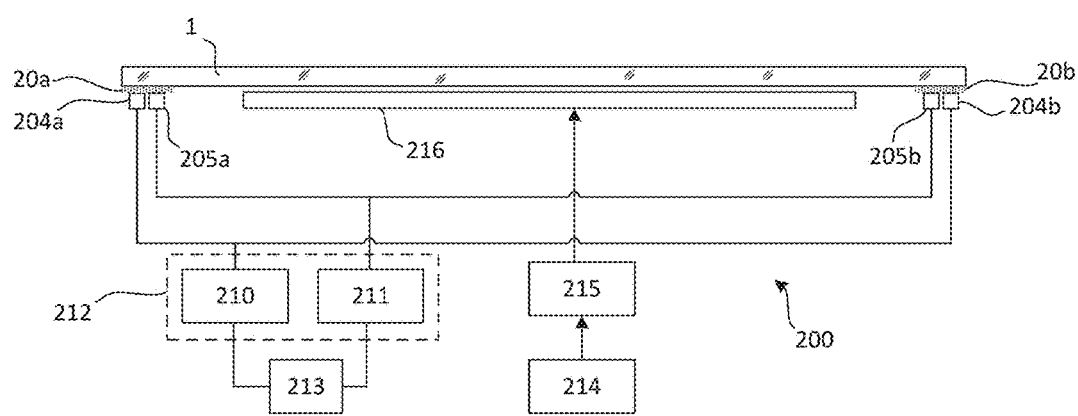

FIGS. 5a and 5b illustrate embodiments of a touch-sensing system 200 including the arrangement 20 according to embodiments of the invention. In FIGS. 5a-5b the arrangement is arranged at the periphery of the panel 3 on a rear surface 201 of the panel which also comprises a front surface 202. In a preferred embodiment, arrangement 20 is positioned such that, for each emitter, the angle where phi equals zero corresponds to the normal of the edge of the panel at the position of the emitter.

Only the left and right portions of the panel 3 are illustrated in FIG. 5a. The rear surface 201 and the front surface 202 are boundary surfaces that define a propagation path for an optical signal or light 203. An emitter 2a is arranged at the arrangement 20a of optical components on one side of the panel 3, and a detector 2b is arranged on another side of the panel 3 at another arrangement 20b of optical components. Arrangement 20a and arrangement 20b may be part of a continuous pattern along an entire side of the panel 3 or around the entire circumference of the panel 3. The emitter 2a and detector 2b are opto-electronic devices that may emit/detect light and be connected to various controllers and other electrical components. For example, the light 203 may propagate from the emitter 204 to the detector 205 and be coupled into and out of the panel 3 by the arrangement 20. Separate arrangements or arrays of optical components may be provided at each emitter 2a and/or detector 2b. Each emitter 2a, or a plurality of emitters 204a, may also be arranged in pair with a detector 205a, 205b of a plurality of detectors, such as is illustrated in FIG. 5b.

Embodiments having arrangement 20 in strips or a variety of shapes are envisaged. In an embodiment of the present invention, arrangement 20 is used to couple the light from the emitter into the panel in the region of interest, as well as couple light in the region of interest out of the panel and to the detector. As described throughout this application, optical pathways for the coupling of light out of the panel is equivalent to the reverse of the coupling of light into the panel. For in-coupling, the present invention provides the advantage of maximizing the amount of light coupled-in to the panel within the region of interest. For out-coupling, the present invention provides the advantage of only coupling light which was in the region of interest out of the panel to the detector, therefore filtering ambient light which may have been propagating in the glass outside of the region of interest. As is illustrated in FIG. 5b, the touch-sensing system 200 may include an activation controller 210 which is connected to selectively control or modulate the activation of the light emitters 204a, 204b and, possibly, a touch controller 211 to selectively detect or provide readout of data from the detectors 205a, 205b. The activation controller 210 and touch controller 211 may also be implemented as a single controller 212 for controlling the touch-sensing system. Depending on implementation, the emitters 204a, 204b and/or detectors 205a, 205b may be activated in sequence or concurrently, e.g. as disclosed in WO2010/064983. One or both of the touch controller 210 and the activation controller 211 may be at least partially implemented by software stored in a memory unit 213 and executed by a processing unit. A main controller 214 may be connected to a display controller 215 which is configured to generate a user interface on a display device 216 based on control signals from the main controller 214. The main controller 214 is thereby operable to coordinate the user interface on the display device 216 with the data from the touch detection system, e.g. touch data from the touch controller 211.

As used herein, a "light emitter" or "emitter" may be any type of opto-electronic device capable of emitting radiation in a desired wavelength range, for example a diode laser, a VCSEL (vertical-cavity surface-emitting laser), an LED (light-emitting diode), electo or opto-lumninisent OLED, display pixel, quantum dot, etc. A light emitter may also be formed by the end of an optical fiber.

Analogously, a "light detector" or "detector" may be any type of opto-electronic device capable of converting light into an electrical signal, such as a photo-detector, a CCD device, a CMOS device, OLED, quantum dot device, etc. The light detector/sensor may be responsive to the light generated by the light emitter. Alternatively the light detector/sensor may be responsive to a different wavelength range, e.g. if the light from the light emitter is subject to a wavelength conversion before reaching the light detector.

When used in the following claims, the terms "comprise", "include", "have" and their conjugates mean, "including but not limited to".

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

The invention claimed is:

1. An optical component for transferring light between an opto-electronic device and a light transmissive panel which defines two opposing boundary surfaces,
   the optical component having a shape corresponding to a geometric shape having a base surface, a lateral front surface and an axis, wherein the geometric shape is truncated by a plane intersecting the front surface, the base surface, and the axis, forming a back surface:
   the base surface being configured for mounting the optical component to the light transmissive panel and for coupling light into the light transmissive panel;

the front surface being configured for coupling light from the front surface, through the base surface, and into the light transmissive panel for the light to propagate by total internal reflection within the light transmissive panel, wherein the base surface comprises an angular filter configured to filter ambient light incident towards the base surface.

2. The optical component according to claim 1 wherein the geometric shape is a right circular cone.

3. The optical component according to claim 1 wherein the geometric shape is a cylinder.

4. The optical component according to claim 1, wherein the angular filter is configured to reflect light incident at an angle 50° relative to a normal of the base surface.

5. The optical component according to claim 1 wherein an angle β between the base surface and the back surface is between 20° and 60°.

6. The optical component according to claim 1 wherein the back surface comprises a reflective coating.

7. The optical component according to claim 6 wherein the reflective coating on the back surface comprises a vacuum deposited layer of aluminum, silver, gold, or copper.

8. A system for transferring light between an opto-electronic device and a light transmissive panel which defines two opposing boundary surfaces, the system comprising:

a plurality of partially overlapping optical components according to claim 1, wherein the plurality of partially overlapping optical components form a continuous element arranged in at least one row with a predetermined peak to peak spacing between peaks of neighboring optical components of a the at least one row, wherein a peak is a point on the optical component furthest from the base surface of the optical component.

9. The system according to claim 8, wherein the peak to peak spacing is the same for all optical components of the at least one row of optical components.

10. The system according to claim 8, wherein the peak to peak spacing varies for optical components of the at least one row of optical components.

11. The system according to claim 8, comprising a plurality of rows of optical components, wherein the peak to peak spacing between the peaks of optical components of separate rows is larger than the peak to peak spacing of neighboring optical components of the same row.

12. The system according to claim 11, wherein the each row is displaced relative to neighboring rows by half of the peak to peak spacing of optical components in the row.

13. The system according to claim 11, wherein random noise is used to determine the peak to peak spacing between the peaks of optical components of separate rows.

* * * * *